Figure 1:
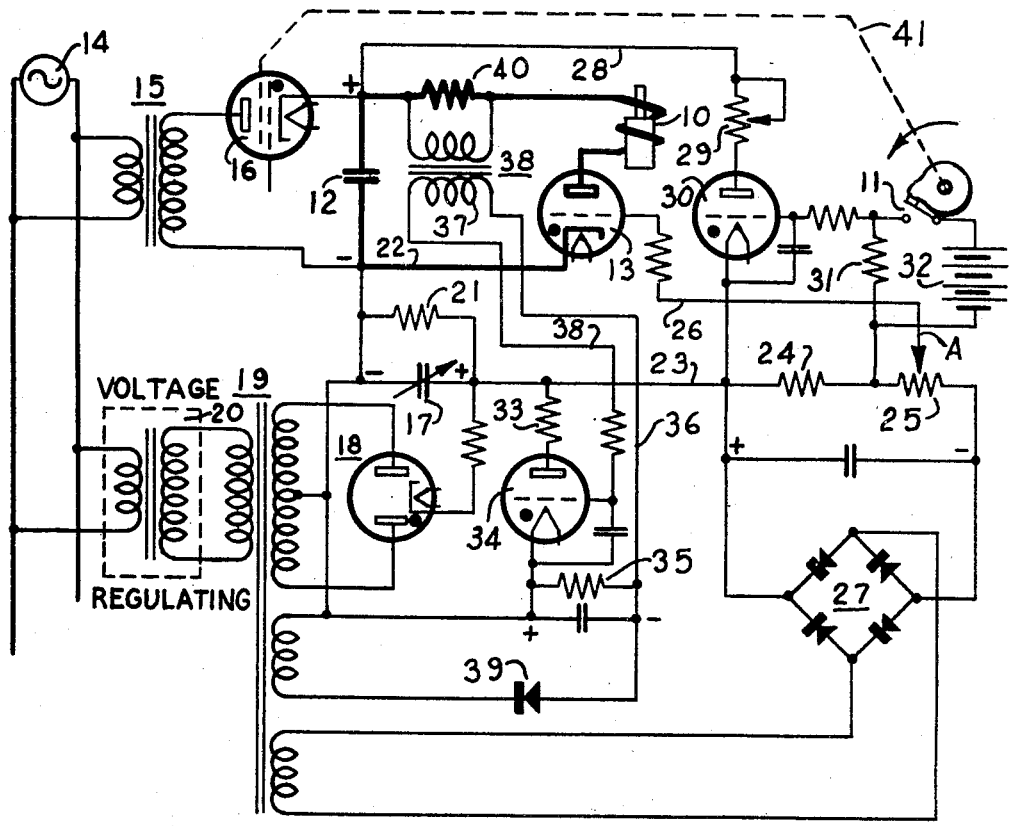

March 2, 1948.     C. E. SMITH     2,436,872
TIMING CIRCUITS
Filed May 19, 1944

Inventor
CLYDE E. SMITH
By Francis J. Klempay
Attorney

Patented Mar. 2, 1948

2,436,872

UNITED STATES PATENT OFFICE 2,436,872

TIMING CIRCUITS

Clyde E. Smith, Warren, Ohio, assignor to The Taylor-Winfield Corporation, Warren, Ohio, a corporation of Ohio Application May 19, 1944, Serial No. 536,339

13 Claims. (Cl. 320—1)

This invention relates to timing systems particularly of the electrical type in which the controlling timed intervals are determined by the rate of charge or discharge of a capacitor. In systems of this character it is possible by utilizing the same charging or discharging circuit to effectively vary the lengths of the timed intervals simply by varying the value of the capacitance employed. The consistency of the timing in the recurrent periods or cycles of operation is, of course, dependent on the maintenance of a predetermined rate of charge (or discharge) and, further, on the maintenance of consistent initial and final capacitor potentials. Also in the operation of electrical circuits including discharge devices in response to the final potential on the timing capacitor which signifies the end of the timing interval it is usually desirable that the controlling potential be of appreciable finite magnitude to avoid appreciable errors and inconsistency in the operation of the circuits. Electrical systems of the general character outlined and as heretofore proposed do not admit of such precision of operation as would satisfy all of these requirements, particularly in environments requiring rapid recurrence of the timing periods or cycles.

The primary object of the present invention is the provision of an improved electrical timing circuit utilizing the charging or discharging time of a capacitor to time out the periods which is operative to effect the timing with greater precision and consequently in a highly consistent manner as regards recurrent or successive timing cycles.

Another object of the invention is the provision of an improved electrical timing circuit utilizing the charging or discharging time of a capacitor as the controlling reference which is operative to effect precise and consistent timing even in systems where the timing cycles are necessarily rapidly recurrent. These latter requirements arise, for example, in the operation of high speed electric resistance spot welding machines employing intermittently movable roller electrodes and in which the welding current is caused to flow and an increased welding force is to be applied through the electrodes in a predetermined number of milliseconds following the initiation of the flow of welding current all within the first portion of the cessation of movement of the electrodes during the cycle of operation. Other specific applications of the invention will readily come to mind as the description proceeds.

The above objects of the invention are accomplished, primarily, by maintaining the voltage on the timing capacitance between predetermined finite values at all times and by recycling or resetting the potential on the capacitance to its predetermined initial value substantially simultaneous with the energization of the end control circuit as resulted from the immediately prior timing action of the capacitance. Thus the timing cycle is made available immediately so that upon application of the next recurrent initiating impulse, however soon it occurs, the timing circuit can immediately begin its operation. By maintaining accurately the recycled or initial potential of the timing capacitance greater precision and more consistency in the length of the timed intervals will result and this is especially true in systems utilizing the charging time of the capacitance as the controlling reference since then the inherent inconsistencies in the charging of the capacitance in its lowest potential range is avoided.

The above and other objects and advantages of the invention will become apparent upon consideration of the following detailed specification and the accompanying drawing wherein there is disclosed a preferred but representative embodiment of the invention.

Figure 2:
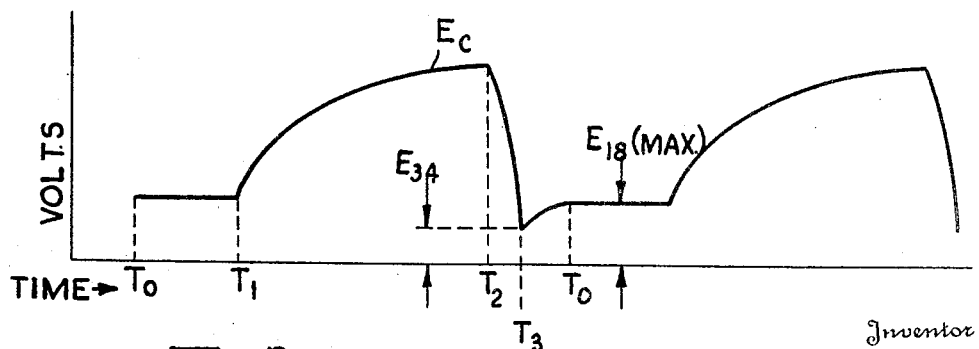

In the drawing:

Figure 1 is a schematic showing of a timing control circuit constructed according to the principles of the invention; and Figure 2 is a curve representing a principle of operation of the circuit of Figure 1.

In the electrical system chosen to illustrate the principles of the invention it is desired to energize solenoid 10 a predetermined interval of time as measured in milliseconds following the appearance of a reference condition which may be made to occur simultaneously with the closing of a switch 11. Solenoid 10 is arranged to be energized by the discharge of capacitor 12 through a suitable valve 13, preferably of the thyratron type, and capacitor 12 may, in turn, be charged from an alternating current source 14 through a transformer 15 and a controlled rectifier 16. In practice, rectifier 16 is controlled in such manner as to maintain a predetermined potential on the capacitor 12 and for this purpose one of the circuits disclosed and claimed in my copending application Serial No. 530,776, filed April 13, 1944, may be utilized.

I provide a timing capacitance 17 on which a predetermined charge is maintained by a rectifier 18, preferably of the full-wave type, which derives its supply of energy from the secondary winding of a transformer 19. The primary winding of transformer 19 is connected to the source 14 through a transformer 20 of the voltage regulating type, the arrangement being such that the voltage maintained on the capacitance 17 by the rectifier 18 remains substantially constant. A resistance 21 is connected across the capacitance 17 and this resistance is in the grid control circuit of the valve 13, such circuit being traceable from the cathode of the valve through conductor 22, resistance 21, conductor 23, resistance 24, potentiometer 25 to tap A, and conductor 26 to the control grid of the tube 13. Normal negative grid bias of sufficient magnitude to overcome the positive potential inserted by the resistance 21 is applied to the control circuit thus outlined by opposing potentials developed across resistance 24 and potentiometer 25 by a rectifier 27, preferably of the dry disk type, deriving energy from a secondary winding of the transformer 19. Tube 13 is thus held non-conducting. Capacitance 12 is charged to a substantially higher voltage than is the timing capacitor 17.

The negative terminal of capacitance 17 is permanently connected with the negative terminal of capacitance 12 while a circuit comprising a conductor 28, potentiometer 29, electric discharge device 30, and conductor 23 is provided to interconnect the positive terminals thereof with the tube 30 properly polarized to permit the charging of capacitance 17 by discharge of capacitance 12. The rate of such charging of the capacitance 17 will, of course, be determined by the preselected values of the capacitance 17 and of the effective resistance offered with potentiometer 29. In the specific embodiment illustrated the time required by such circuit to charge the capacitance from its initial voltage as determined by the output of rectifier 18 to the higher voltage necessary for the control grid of tube 13 to reach its critical potential is utilized to determine the lengths of the timing periods.

Tube 30 is preferably also of the controlled type employing an ionizable medium and it should be understood that the initiation of conduction in the tube 30 starts the timing periods. Tube 30 is normally biased to cut-off by the potential developed across resistance 24 by the rectifier 27, the resistance 24 being in the grid circuit of the tube 30 which circuit includes also a resistance 31. A suitable source of positive potential as, for example, a battery 32, is arranged to be connected across the resistance 31 by the switch 11 so that upon closure of the switch tube 30 begins to conduct. It should be understood that various means other than the switch 11 and source 32 may be employed to start conduction in tube 30. For example, in the application of the invention to an electric resistance welding system of the double welding force type the output of a current transformer may be utilized to fire the tube 30 upon the initiation of flow of the welding current. For this purpose a circuit arrangement as disclosed and claimed in copending application Serial No. 482,630 of M. A. Seeloff and C. E. Smith may be advantageously utilized, this application having now matured into Patent No. 2,363,753, dated November 28, 1944. In this specific use of the invention energization of solenoid 10 would result in the actuation of a mechanical valve for increasing the welding force applied to the electrodes.

I provide a discharge circuit for the capacitance 17 comprising a current limiting resistance 33 of comparatively small value and an electric discharge device 34 in series, said discharge device being of the controlled type and preferably having an ionizable medium. Tube 34, moreover, should be of the type having consistent characteristics as regards its de-ionizing potential which is to say that the difference in potential between its anode and cathode should be the same at the end of each recurrent period of conduction. A control circuit for tube 34 comprising a resistance 35, a conductor 36, secondary winding 37 of a transformer 38, and a conductor 39 is provided and normally the control member of the tube 34 is held sufficiently negative with respect to the cathode thereof to block the tube by the potential developed across resistance 35 by a rectifier 39 which derives its energy from a secondary winding of the transformer 19. The primary winding of transformer 38 is connected across a resistance 40 interposed in the energizing circuit for the solenoid 10 and it should be clear that upon the initiation of current flow through the solenoid a voltage impulse will be induced in the secondary winding 37. Transformer 38 is so connected that the polarity of the impulse induced in secondary 37 is in opposition to the normal negative grid bias applied by the resistance 35. Moreover, the impulse is of sufficient magnitude to drive the control member of tube 34 positive with respect to the cathode to insure the start of conduction in the tube. Upon conduction in tube 34 the capacitance 17 will be discharged at a rapid rate depending on the value of the resistance 33 to a predetermined minimum voltage determined by the potential drop across the tube 34. By selecting resistance 33 merely large enough to protect the discharge circuit the voltage across the capacitance will be lowered in an inconsequential period of time and the final potential across the capacitance thus discharged will always be equal to the potential drop across the tube 34. In practice, the peak output voltage of the rectifier 18 is so related to the potential drop across the tube 34 that the discharge in tube 34 drains capacitance 17 down to a value just immediately below the peak output of the rectifier 18. The ideal mode of operation would be, of course, the draining down of the capacitance to a peak voltage of the output of the rectifier 18 but the difficulty of insuring the de-ionization of the tube 34 and the variation in the time required for the capacitance 17 to leak off the excess charge if it should develope that tube 34 is extinguished while the voltage across capacitance 17 is above the output peak of the rectifier 18 precludes this mode of operation. However, since capacitance 17 is fairly small and the drop below the output peak of rectifier 18 is relatively small capacitance 17 will be rapidly brought up to its predetermined minimum charge particularly since its charging rectifier is arranged for full wave operation.

In considering the operation of the embodiment of the invention described above the capacitances 12 and 17 are, at the outset, charged to their respective voltages as determined by the control, not shown, of the rectifier 16 and by the peak output voltage of the rectifier 18. At this time tubes 13, 30 and 34 are non-conducting and if now the potential of source 32 is applied to the control grid of tube 30 by the closing of switch 11, for example, which signifies the occurrence of an original reference condition in a complete machine or system utilizing the apparatus described herein, tube 30 begins to conduct and the charge on capacitance 17 is raised at a rate depending on the setting of the potentiometer 29. Upon the capacitance 17 attaining a predetermined maximum charge the rising potential across resistance 21 reaches a value sufficient to "fire" tube 13 the conduction of which discharges capacitance 12 through the solenoid 10 to actuate the armature thereof for the purpose of effecting a second condition in timed delayed relation in respect to the occurrence of the first original reference condition. Immediately upon the initiation of current flow in the energizing circuit for solenoid 10 the tube 34 is rendered conductive by potential impulse furnished by transformer 38 to immediately drain off the excess or timing potential appearing on the capacitance 17.

The operation of the circuit described can be readily understood from an inspection of the curve of Figure 2 which represents the voltage across the timing capacitance 17. At the time $T_0$ the capacitance 17 is charged to the peak voltage of the output of its charging rectifier 18 and by reason of the regulated nature of the input to the rectifier this predetermined charge will be maintained on the capacitance. At the time $T_1$ which coincides with the closing of switch 11 the timing period begins and the charge on capacitance 17 rises to its maximum value sufficient to initiate condition in tube 13. At this time conduction in tube 34 causes a rapid drop in the potential across capacitance 17 and at time $T_3$ which closely follows $T_2$ the charge on capacitance 17 will have decreased to the value of the potential drop across tube 34. As indicated and as explained above, this latter potential is only slightly below the peak value of the output of the rectifier 18 so that in a short interval of time as represented by the space between $T_3$ and $T_0$ the charge on the capacitance will rise to its predetermined minimum value in preparation for the next cycle of operation. It should be observed that since the entire recycling period as represented by the lapse of time between $T_2$ and $T_0$ is but a small portion of the total time period of the complete cycle of operation, i. e., from time $T_0$ to $T_0$ the timing system of the invention is particularly suited to applications requiring rapidly recurrent cycles of operation. Moreover, since the operating range of the potential change on the timing capacitor is always maintained within accurately controllable limits highly consistent results are attained in the successive cycles of operation.

In the electrical system described above it is ordinarily desirable to block the rectifier 16 during operation of the solenoid energizing circuit to insure the deionization of the medium in tube 13 and the consequent deionization of the medium in tube 34 as will be understood and this may be readily accomplished by any suitable means indicated schematically at 41 which is operative to apply a blocking potential to one of the control grids, preferably the screen grid, of the rectifier 16 synchronously with the closing of the switch 11. Rectifier 16 is, of course, held blocked until capacitance 12 is discharged and switch 11 opened in preparation for the next cycle of operation.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. Electrical timing apparatus comprising in combination a capacitance, means to normally maintain a predetermined voltage on said capacitance, a timing circuit operative to change the potential on said capacitance to a second predetermined voltage in a predetermined interval of time, means to initiate operation of said timing circuit, a control circuit adapted to be actuated upon said capacitance reaching said second predetermined voltage, and means operative substantially simultaneously with actuation of said control circuit to change the charge on said capacitance to approximately said first mentioned predetermined voltage.

2. Electrical timing apparatus comprising in combination a capacitance, means to normally maintain a predetermined minimum voltage on said capacitance, a charging circuit for said capacitance to increase the charge thereon to a second predetermined voltage in a predetermined interval of time, means to initiate operation of said charging circuit, a control circuit operative in response to the potential attained by said capacitance to effect a condition upon said capacitance attaining said second predetermined voltage, and means operative substantially simultaneously with the effecting of said condition to decrease the charge on said capacitance to approximately said minimum voltage.

3. Electrical timing apparatus comprising in combination a capacitance, means to normally maintain a predetermined minimum charge on said capacitance, a charging circuit for said capacitance to increase the charge thereon to a second predetermined voltage in a predetermined interval of time, means to initiate operation of said charging circuit, a control circuit operative in response to the potential obtained by said capacitance to effect a condition upon said capacitance attaining said second predetermined voltage, an electric discharge device connected across said capacitance, and means operative substantially simultaneously with the effecting of said condition to initiate conduction in said discharge device whereby the voltage on said capacitance is rapidly decreased to a value determined by the potential drop across said device.

4. In combination, an electrical energy source, a load circuit including circuit controlling means adapted to be energized from said source, a capacitance, means to normally maintain said capacitance charged to a predetermined minimum voltage, a timing circuit operative to change the potential on said capacitance to a second predetermined voltage in a predetermined interval of time, means to initiate operation of said timing circuit, means responsive to the voltage on said capacitance and connected to said circuit controlling means whereby said load circuit may be energized upon said capacitance reaching said second predetermined voltage, and means responsive to the flow of current in said load circuit to change the charge on said capacitance to approximately said first mentioned predetermined voltage.

5. Electrical timing apparatus comprising in combination a capacitance, means to normally maintain a predetermined voltage on said capacitance, a timing circuit operative to change the potential on said capacitance to a second predetermined voltage in a predetermined interval of time, means to initiate operation of said timing circuit, means responsive to the voltage of said capacitance to effect a condition upon said capacitance reaching said second predetermined voltage, and means operative upon said condition being effected to rapidly change the charge on said capacitance to a value slightly below said first mentioned predetermined voltage.

6. Electrical timing apparatus comprising in combination a capacitance, means to normally maintain a predetermined voltage on said capacitance, a charging circuit for said capacitance to increase the charge thereon to a second predetermined voltage in a predetermined interval of time, means to initiate operation of said charging circuit, means responsive to the voltage on said capacitance and operative to effect a condition upon said capacitance attaining said second predetermined voltage, and means operative upon said condition being effected to rapidly decrease the charge in said capacitance to slightly below said first mentioned predetermined voltage.

7. Apparatus according to claim 6 further characterized in that said last mentioned means comprises an electric discharge device having an anode-cathode circuit connected across said capacitance and a control member adapted to be energized upon the effecting of said condition.

8. Apparatus according to claim 4 further characterized in that said last mentioned means comprises an electric discharge device having an anode-cathode circuit connected across said capacitance and a control member, and an induction device arranged to be energized by the flow of current from said load circuit, said induction device being connected to said control member for energizing the same upon energization of said induction device.

9. In combination, a control circuit, a capacitance, means to normally maintain a predetermined charge on said capacitance, a circuit for energizing said control circuit from said capacitance comprising a circuit controlling device, a timing capacitance, means to normally maintain a lower predetermined initial charge on said timing capacitance, a controllable timing circuit interconnecting said capacitances whereby said timing capacitance may be charged above its initial voltage at a predetermined rate, means to initiate conduction in said timing circuit, means to initiate conduction in said circuit controlling device upon said timing capacitance attaining a second predetermined voltage whereby said control circuit is energized, and means operative to rapidly discharge said timing capacitance to a voltage approximating said initial voltage upon energization of said control circuit.

10. Apparatus according to claim 9 further characterized in that said last mentioned means comprises an electric discharge device having an anode-cathode circuit connected across said timing capacitance and a control member, and means to impress a positive biasing potential on said control member comprising an induction device arranged to be energized by the initiation of current flow in said control circuit.

11. Apparatus for timing an interval in each of a series of rapidly recurrent cycles of operation comprising in combination a capacitance, means to effect a predetermined change in the charge on said capacitance in a predetermined time during each cycle of operation, means to initiate operation of said means to change, means to effect a condition upon said change being completed, and means to restore the charge on said capacitance to its initial value substantially simultaneously with the effecting of said condition.

12. Apparatus according to claim 11 further characterized in that said means to change comprises means to increase the charge on said capacitance and in that said means to restore comprises an electric discharge device having an anode-cathode circuit shunted across said capacitance.

13. Electrical timing apparatus comprising in combination a capacitance, means to normally maintain a predetermined voltage on said capacitance, a timing circuit operative to change the potential on said capacitance to a second predetermined voltage in a preselected interval of time, means to initiate operation of said timing circuit, means to effect a condition upon said capacitance reaching said second predetermined voltage, and means operative in response to the effecting of said condition to change the charge on said capacitor back to approximately said first mentioned voltage.

CLYDE E. SMITH.

REFERENCES CITED

The following references are of record in the file of this patent:

UNITED STATES PATENTS

| Number | Name | Date |
| --- | --- | --- |
| 2,071,773 | Sidney | Feb. 23, 1937 |
| 2,249,488 | Nickle | July 15, 1941 |
| 2,295,293 | Rogers | Sept. 8, 1942 |
| 2,306,237 | Wolfner, 2d | Dec. 22, 1942 |